Feb. 28, 1967     E. W. TURNER     3,306,657
AUXILIARY VISOR ATTACHMENT
Filed June 3, 1965
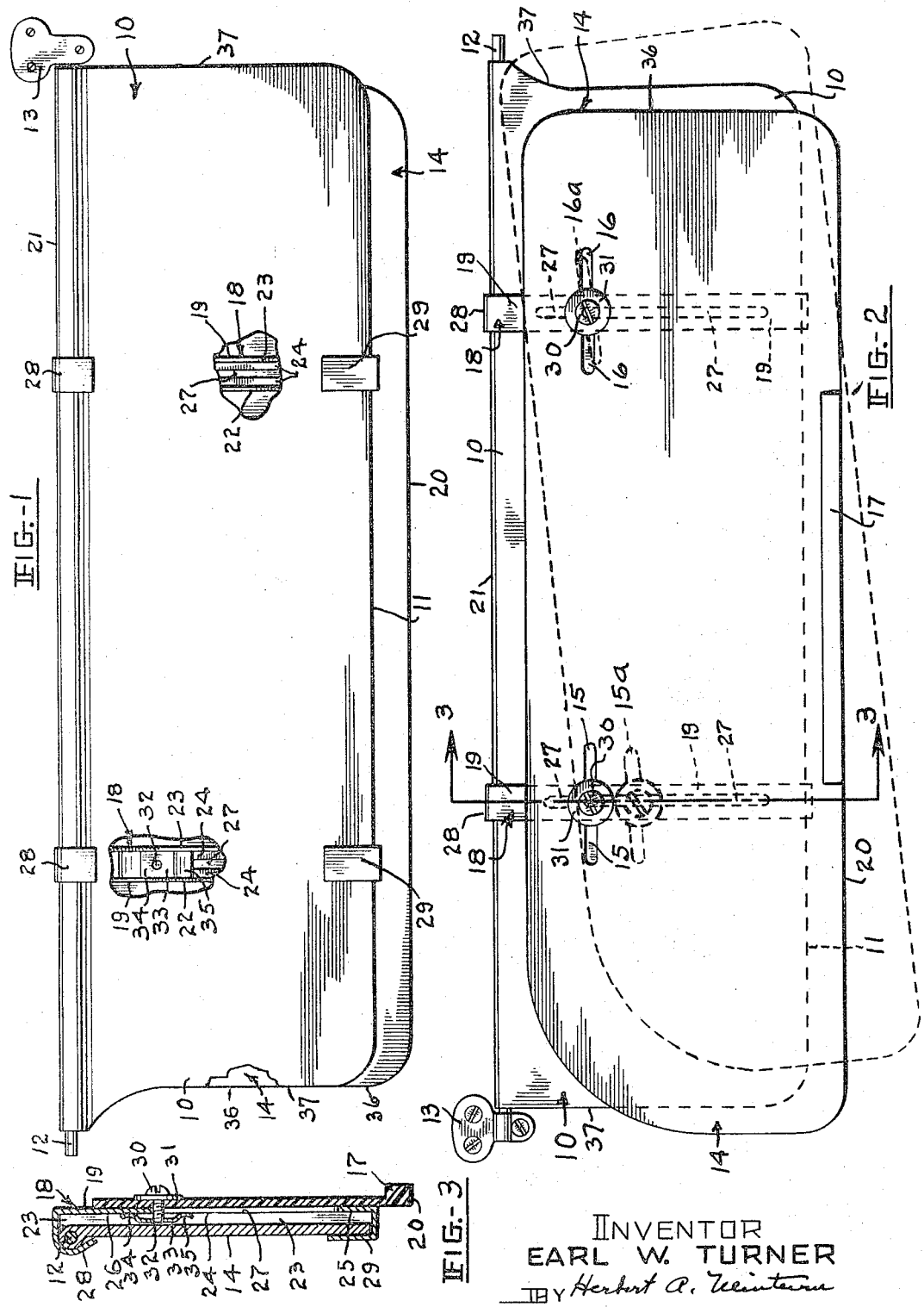
INVENTOR
EARL W. TURNER
BY Herbert A. Weintraub
ATTORNEY

United States Patent Office 3,306,657
Patented Feb. 28, 1967

3,306,657
AUXILIARY VISOR ATTACHMENT
Earl W. Turner, 906 W. Superior St.,
Kokomo, Ind. 46901
Filed June 3, 1965, Ser. No. 460,971
5 Claims. (Cl. 296—97)

The invention set forth herein relates particularly to an auxiliary visor to be adjustably and removably attached to the standard visor which is present in modern day automobiles, but may be employed in other relations.

One of the annoyances which may be dangerous at times affecting the driver of an automobile is to have the glare of oncoming automobile headlights strike him and tend to blind him, and also the glare of sunshine when the sun is low in the sky doing the same thing. The visors furnished with automobiles are either too short in vertical height when lowered, or are not horizontally long enough so that glare which comes under or around the ends of the visor from ahead or the side of the driven automobile cannot be shielded against and still permit the driver to have adequate sight of the road ahead.

My auxiliary visor, being carried by the regular corner hinged visor, may be swung around to shield below or at either end of the regular visor to intercept glare from either side of the roadway and provide for full vision of the roadway, and the roadside scenery at the side from which no glare comes.

Reference is made to my Patent No. 3,071,408 issued January 1, 1963, for a solution of this problem. The device illustrated and claimed in that patent operates satisfactorily, but is rather complex and requires a relatively large number of parts.

The present invention described herein is an improvement over that structure and also the operation of the device shown in the form in the patent as indicated. In the present invention, I have been able to solve several problems. The light intercepting or dimming device is provided with two horizontally spaced apart linear slots only and carries no vertical slots. The attaching brackets as between the light intercepting member and the automobile visor carry adjustable means to permit raising and lowering the light intercepting member either linearily, vertically or downwardly or may permit the member to be dropped at one corner without dropping the other corner, that is, the lower corners, so as to intercept light which may be coming from straight ahead or at an angle. Furthermore, the invention includes frictional retaining members slidably carried by the attaching brackets.

These and other features resulting in the overall improvement invention are described in reference to the accompanying drawing, in which—

FIG. 1 is a view in fragmentary front elevation (viewed from front of a vehicle) of the invention as attached to the rear side of an automobile visor with the auxiliary visor dropped down a bit;

FIG. 2 is a view in rear elevation of the invention attached to the visor; and

FIG. 3 is a view in vertical section on the line 3—3 in FIG. 2.

The visor furnished with the automobile, generally designated by the numeral 10 is substantially rigid and planar, and has a straight edge 11 across its lower edge. The visor 10 is carried on a hinge rod 12 which is mounted in at least one end bracket 13 to rotate by an end portion therein. This visor 10 is opaque and when it is rocked into a vertically hanging position, the lower edge 11 is approximately on the level of horizontal sight of the driver.

A planar sheet of a plastic or other material designated by the numeral 14 is selected to be either opaque or translucent as may be desired. This sheet 14 is in effect an auxiliary visor which is mounted on the back side of the visor 10. The auxiliary visor 14 has a length preferably equal to or slightly less than that of the horizontal length of the opaque visor 10, and has a height less than that of the visor 10 but in any event a height for use on car visors which may vary as much as one-half to one inch. The visor 14 is provided with a pair of slots 15 and 16 therethrough centered on a common line parallel to and spaced a short distance below the top edge, and each may range in horizontal length from about 1⅛ to 1½ inches, this length not being critical as to exact dimensions.

The auxiliary visor 14 preferably has its corners rounded, the upper left hand corner being rounded by a greater radius than the radii of the other three corners for car roof clearance. Also, preferably, a ledge 17 forming a finger grip is placed along the rear side of the auxiliary visor 14 centrally and adjacent its lower edge 20. This ledge 17 may be an integral part of the auxiliary visor 14, or may be made a separate part secured thereto.

Two brackets, each generally designated by the numeral 18 in general, are identical in size and shape so that the description of one is sufficient to describe the other. The bracket 18 in each instance has a channel major length short enough not to overextend either the bottom or top edges 11 and 21 of the standard or automobile carried visor 10. As indicated in FIGS. 1 and 3, this length 19 has the two side legs 22 and 23 interconnected by the back or web 24. This web terminates by a solid portion 25 at the lower end and the solid portion 26 at the upper end of the length 19. A slot 27 centrally extends through the web 24 between the solid end portions 25 and 26.

Each bracket 18 has an upper and a lower tongue 28 and 29 respectively with a width approximating the width of the web 24, that is, the width of the web ends 25 and 26. These tongues are long enough to fit over the top and bottom edges of the visor 10 and extend downwardly and upwardly respectively on the forward side, even should the visor 10 vary in height from one-half to one inch as they sometimes do, and are bendable by hand. Each of these brackets 18 is attached to the visor 10 by bringing them up against the back side of the visor 10, FIG. 2, with the legs of the channels bearing against the back of the visor 10, and the tongues 28 and 29 are bent around respectively over the top and bottom edges 21 and 11 of the visor 10 in a snug manner. The spacing apart of one bracket 18 from the other bracket 18 will be in accordance with the locations of the slots 15 and 16 through the auxiliary visor 14 so that when the visor is carried laterally to an extreme end limitation of the slots, such for example as shown in FIG. 2 where the slots are at the extreme left hand locations, to have the ends of the slots aligned with the right hand sides of the bracket slots 27. In other words, by shifting the brackets 18 along the car visor 10, the visor 14 is located to be in adjustable positions along the back side of the car visor 10.

A screw member 30 carries a washer 31 either separately or integrally, to bear against the rear side of the visor 14 when the screw is inserted through each of the slots 15 and 16 to pass through the bracket slots 27. The screw 30 after passing through the bracket slots 27 in each instance screw-threadedly engages a threaded hole 32 in a shoe 33. This shoe as indicated in FIG. 1 and FIG. 3 is preferably a spring member, the central portion of which is arched between two feet 34 and 35. The turning of the screw 30 to thread it into the hole 32 of the shoe 33 draws the feet 34 and 35 against the web portions on each side of the slot 27. The degree of tightening of the screw 30 in connection with the shoe 33 determines the pressure of course of these feet 34 and 35 on the web portions and consequently determines the ease of sliding the auxiliary visor 14 relative to the two brackets 28 and also to permit this visor to shift under the washer 31. The shoe 33 has sufficient width to permit it to shift freely longitudinally of the length 19 but with little clearance so that there is guidance of the shoe within the channel length 19 of each bracket 18.

In operation, the screws 30 will be so adjusted for the required pressure urging the auxiliary visor 14 against the bracket lengths 19 to retain the visor 14 in any position to which it may be shifted in up and down and longitudinally movement of the auxiliary visor relative to the fixed visor 10. For example, in FIG. 1, the auxiliary visor 14 is shown in a slightly lowered position. Lowering of the auxiliary visor 14 may be had by pulling it downwardly within the limit of travel of the shoes 33 as determined by the lengths of the slots 27, which may be as much as three inches. The visor 14 may be shifted to the right, horizontally, by reason of the slots 15 and 16 being so shifted relative to the screws 30. In so doing, the right hand end 36 may be carried toward the automobile rear view mirror (not shown) to intercept any glare of light which may tend to pass between the corresponding end 37 of the car visor 10 and the end 36 of the auxiliary visor 14.

The slots 15 and 16 in the auxiliary visor are provided to permit side or horizontal shifting of that visor to block off sun glare coming through the otherwise open space at the upper left side of the car visor. The car visor mounting bracket requires this small opening space and sun rays that come through this opening at certain angles make driving very difficult. Also in some cases, it may be desirable to rock the visor 14 from the normal horizontally shiftable position such as is indicated in FIG. 2 by the dash line position where the lefthand end has been lowered to lower the lefthand screw 30 and the right-hand end has been allowed to rock on the righthand screw 30 without shifting it downwardly in the solt 27. As will be observed, by the dash lines, the slots 15 and 16 will then appear in the dash-line positions 15a and 16a. Again this lateral shifting of the visor 14 over the car visor 10 will be, in extent, controlled by the lengths of the slots 15 and 16 which may be varied to give the maximum desired shifting. Of course either end of the visor 14 may be rocked downwardly or upwardly intermediate the ends of the slots 27 to give the desirable visor position to intercept the glaring lights as may be encountered under different driving conditions and still permit good visibility of the road and roadside.

Thus the visor 14 may be shifted to extend beyond either end of the car visor 10 as may be desired. Also, when the visor 10 is rotated to extend in a fore and aft direction along the upper portion of the automobile door (not shown) at either end or ends of the front seat, or shifted longitudinally of the rod 12, the visor 14 may be lowered, shifted forwardly or rearwardly of the visor 10 to intercept any glare of light coming below or at either end of the visor 10. It is to be noted that the visor 10 illustrated in the drawing is the left hand visor. The visor 14 is equally operable on a right hand visor.

By use of my invention, no drilling, threading, cutting or removal of any car parts is required. The brackets are simply brought against the car visor back in parallel alignment, with the lower ends 29 preferably formed to hook up over the bottom car visor edge, and the top ends 28 bent around and down over the top 21. One suitable bracket material is rubber coated aluminum.

While I have herein shown and described my invention in this one specific and precise form, it is subject to mechanical changes for example such as in the shoe 33, the interengagement of the visor 14 with that shoe; and the means of attaching the brackets 18 to the car visor 10, and I therefore do not desire to be limited to that precise form beyond the limitations which may be necessarily imposed by the following claims.

I claim:
1. Visor means selectively intercepting rays of light of brilliance interfering with normal vision, comprising
   a sheet of material intercepting at least a part of light rays directed theretoward;
   said sheet having a pair of slots therethrough aligned on a normal horizontal line;
   a pair of sheet carrying brackets, each approaching the height of said sheet and comprising a channel member having a web, from the sides of which extend legs;
   said web being slotted in partial width throughout a major length thereof;
   a shoe carried by each of said brackets in said bracket channel;
   means extending through each of the slots of said sheet abutting the sheet from the entry side and screw-threadedly passing through said bracket slots and engaging the shoe against said web for variable frictional retention of the sheet against said brackets;
   a bendable tongue on each end of each bracket; and
   a carrying member to which said brackets are attached by engagement of said terminal ends over portions thereof.

2. The structure of claim 1, in which
   said carrying member has spaced apart upper and lower edges; and
   said tongues engaging over said edges, maintaining said brackets in parallelism.

3. The structure of claim 1, in which
   said screw-threaded means comprises a screw;
   said shoe consists of a bowed length of spring material, wherein the central zone is threaded and receives said screw;
   said bowed lengths bowing away from said webs; and
   end portions of said bowed lengths serving as feet bearing against the web portions at the sides of the web slots.

4. The combination with a vehicle visor, of an auxiliary visor comprising
   a sheet of at least partial light interception;
   said sheet having a pair of slots therethrough spaced one from the other, elongated along a common, approximately horizontal line;
   a pair of brackets carrying said sheet, one bracket at each of said slots;
   each bracket comprising a major channel length having a leg extending from each side of a central web, the web being centrally slotted longitudinally of said web to leave a web portion along each side of the slot therethrough; and a bendable finger extending from the web at each end thereof;
   a screw having a head member and extending through each of said sheet slots and through each of the bracket web slots;
   a friction shoe being shiftably movable over said web portions between the bracket legs;
   said shoe having an elastic foot on each end bridging said web slot and bearing on said web portions;
   said screw screw-threadedly engaging said shoe between said feet and pulling the screw head member against said sheet across the sheet slot through which the screw passes;
   said brackets being spaced along said vehicle visor and spaced apart parallel one with the other; and
   said tongues being bent over top and bottom edges of said vehicle visor firmly retaining the brackets on the vehicle visor permitting shifting of the sheet over the brackets overcoming frictional resistance, said shifting being selectively vertically, horizontally and angularly therebetween.

5. The structure of claim 4, in which
   said shoe consists of a bowed flat spring steel length with upturned ends constituting said feet; and said brackets are turned to have their webs against said sheet.

References Cited by the Examiner
UNITED STATES PATENTS 2,101,901 12/1937 Fletcher _____ 296—97

3,071,408 1/1963 Turner _____ 296—97

MILTON BUCHLER, *Primary Examiner.*

J. A. PEKAR, *Assistant Examiner.*